US009926633B2

(12) United States Patent
Kikuchi et al.

(10) Patent No.: US 9,926,633 B2
(45) Date of Patent: Mar. 27, 2018

(54) METHOD FOR GENERATING HYDROGEN BY WATER SPLITTING, AND PHOTOELECTROCHEMICAL CELL AND SEMICONDUCTOR ELECTRODE USED THEREFOR

(71) Applicant: Panasonic Intellectual Property Management Co., Ltd., Osaka (JP)

(72) Inventors: Ryosuke Kikuchi, Osaka (JP); Takaiki Nomura, Osaka (JP); Kazuhito Hato, Osaka (JP); Satoru Tamura, Osaka (JP); Takahiro Kurabuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 456 days.

(21) Appl. No.: 14/676,734

(22) Filed: Apr. 1, 2015

(65) Prior Publication Data

US 2015/0322577 A1 Nov. 12, 2015

(30) Foreign Application Priority Data

May 9, 2014 (JP) .................................. 2014-097291

(51) Int. Cl.
| | |
|---|---|
| *C25B 1/04* | (2006.01) |
| *C25B 11/04* | (2006.01) |
| *H01G 9/20* | (2006.01) |
| *C01B 3/04* | (2006.01) |
| *C25B 1/00* | (2006.01) |

(52) U.S. Cl.
CPC ................ *C25B 1/04* (2013.01); *C01B 3/042* (2013.01); *C25B 1/003* (2013.01); *C25B 11/04* (2013.01); *C25B 11/0478* (2013.01); *H01G 9/20* (2013.01); *Y02E 60/364* (2013.01); *Y02E 60/368* (2013.01); *Y02P 20/135* (2015.11)

(58) Field of Classification Search
CPC ...................... C25B 1/003; C25B 1/04; C25B 11/00–11/0494
See application file for complete search history.

(56) References Cited

U.S. PATENT DOCUMENTS

| | | |
|---|---|---|
| 2012/0028141 A1 | 2/2012 | Nomura et al. |
| 2013/0192984 A1 | 8/2013 | Nomura et al. |
| 2014/0057187 A1 | 2/2014 | Suzuki et al. |

FOREIGN PATENT DOCUMENTS

| | | |
|---|---|---|
| JP | 51-123779 | 10/1976 |
| WO | 2011/016244 | 2/2011 |
| WO | 2013/018366 | 2/2013 |
| WO | 2013/084447 | 6/2013 |

OTHER PUBLICATIONS

Smestad, G.p. et al. "Reporting solar cell efficiencies in Solar Energy Materials and Solar Cells" Solar Energy Materials & Solar Cells, vol. 92, (2008), pp. 371-373.

*Primary Examiner* — Nicholas A Smith
(74) *Attorney, Agent, or Firm* — McDermott Will & Emery LLP

(57) ABSTRACT

The present invention provides a method for generating hydrogen by water splitting at a higher hydrogen generation efficiency. In the present method, used is a photoelectrochemical cell comprising a container, a liquid stored in the container, a semiconductor electrode contained in the container, and a counter electrode contained in the container. The semiconductor electrode comprises a first semiconductor layer, a light-transmissive conductor layer; and a second semiconductor layer.

42 Claims, 12 Drawing Sheets

METHOD FOR GENERATING HYDROGEN BY WATER SPLITTING, AND PHOTOELECTROCHEMICAL CELL AND SEMICONDUCTOR ELECTRODE USED THEREFOR

BACKGROUND

1. Technical Field

The present invention relates to a method for generating hydrogen by water splitting. The present invention also relates to a photoelectrochemical cell and a semiconductor electrode used for the method.

2. Description of the Related Art

United States Patent Application Pre-Grand Publication No. 2012/0028141, which is equivalent to WO 2011/016244, discloses a photoelectrochemical cell 900. As shown in FIG. 9, this photoelectrochemical cell 900 includes: a semiconductor electrode 920 including a substrate 921, a first n-type semiconductor layer 922 disposed on the substrate 921, and a second n-type semiconductor layer 923 and a conductor 924 disposed apart from each other on the first n-type semiconductor layer 922; a counter electrode 930 connected electrically to the conductor 924; an electrolyte 940 in contact with surfaces of the second n-type semiconductor layer 923 and the counter electrode 930; and a container 910 accommodating the semiconductor electrode 920, the counter electrode 930 and the electrolyte 940. In the semiconductor electrode 920, relative to a vacuum level, (I) band edge levels of a conduction band and a valence band in the second n-type semiconductor layer 923, respectively, are higher than band edge levels of a conduction band and a valence band in the first n-type semiconductor layer 922, (II) a Fermi level of the first n-type semiconductor layer 922 is higher than a Fermi level of the second n-type semiconductor layer 923, and (III) a Fermi level of the conductor 924 is higher than the Fermi level of the first n-type semiconductor layer 922. The photoelectrochemical cell 900 generates hydrogen by irradiation of the second n-type semiconductor layer 923 with light.

SUMMARY

The hydrogen generation efficiency in such a photoelectrochemical cell is expected to be further improved.

An object of the present invention is to provide a method for generating hydrogen by water splitting at a higher hydrogen generation efficiency. Another object of the present invention is to provide a photoelectrochemical cell and a semiconductor electrode which are suitable for the method.

The present invention provides a method for generating hydrogen by water splitting. The method comprises:

(a) preparing a photoelectrochemical cell comprising:
a container;
a liquid stored in the container;
a semiconductor electrode contained in the container; and
a counter electrode contained in the container, wherein
the semiconductor electrode comprises:
   a first semiconductor layer;
   a light-transmissive conductor layer; and
   a second semiconductor layer;
the light-transmissive conductor layer is interposed between the first semiconductor layer and the second semiconductor layer;
the light-transmissive conductor layer and the first semiconductor layer form an ohmic contact;
the light-transmissive conductor layer and the second semiconductor layer form an ohmic contact;
a bandgap of the first semiconductor layer is equal to or wider than a bandgap of the second semiconductor layer;
the first semiconductor layer is in contact with the liquid;
the second semiconductor layer is in contact with the liquid;
the counter electrode is in contact with the liquid;
the counter electrode is electrically connected to the light-transmissive conductor layer; and
the liquid is an electrolyte aqueous solution or water; and (b) generating hydrogen on the counter electrode by irradiating the first semiconductor layer with light in such a manner that the light which has travelled through the first semiconductor layer reaches the second semiconductor layer through the light-transmissive conductor layer.

The present invention provides a method for generating hydrogen by water splitting at a higher hydrogen generation efficiency. The present invention also provides a photoelectrochemical cell and a semiconductor electrode which are suitable for the method.

DETAILED DESCRIPTION OF THE EMBODIMENTS

The embodiments of the present invention will be described below in more detail with reference to the drawings.

First Embodiment

Figure 1:
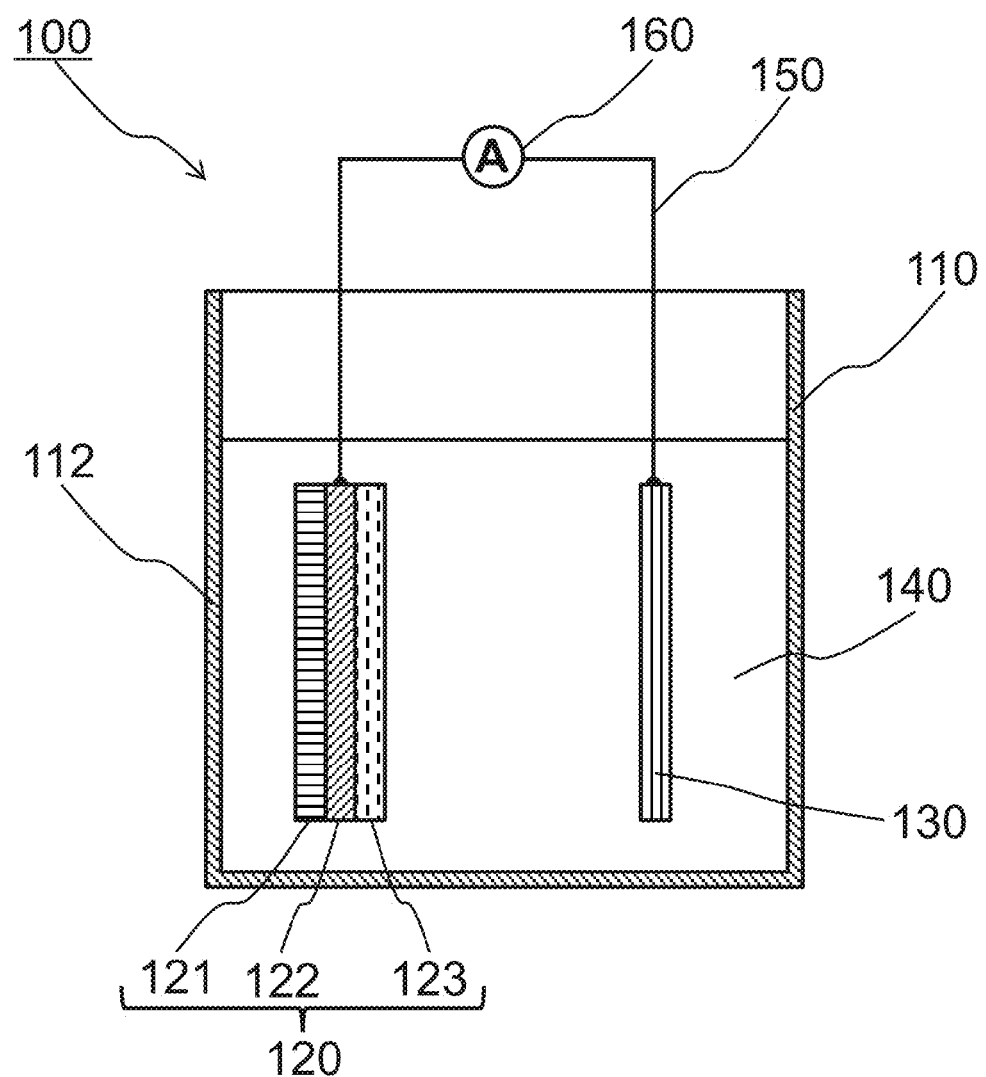
FIG. 1 shows a schematic cross-sectional view of a photoelectrochemical cell 100 according to a first embodiment.

FIG. 1 shows a schematic cross-sectional view of a photoelectrochemical cell 100 according to the first embodiment. As shown in FIG. 1, the photoelectrochemical cell 100 according to the first embodiment comprises a container 110, a liquid 140, a semiconductor electrode 120, and a counter electrode 130. The liquid 140 is stored in the container 110. The semiconductor electrode 120 and the counter electrode 130 are contained in the container 110.

The semiconductor electrode 120 comprises a first semiconductor layer 121, a light-transmissive conductor layer 122, and a second semiconductor layer 123. The light-transmissive conductor layer 122 is interposed between the first semiconductor layer 121 and the second semiconductor layer 123. More specifically, the light-transmissive conductor layer 122 has a front surface and a back surface. The first semiconductor layer 121 is disposed on the front surface of the light-transmissive conductor layer 122. The second semiconductor layer 123 is disposed on the back surface of the light-transmissive conductor layer 122.

The first semiconductor layer 121 has the same bandgap as the second semiconductor layer 123. Alternatively, the first semiconductor layer 121 has a wider bandgap than the second semiconductor layer 123. In other words, the value of the bandgap of the first semiconductor layer 121 is not less than the value of the bandgap of the second semiconductor layer 123. A part of the container (hereinafter, referred to as a "light-incident part 112") is formed of a light-transmissive material. The light-incident part 112 is opposite to the first semiconductor layer 121 included in the semiconductor electrode 120 disposed in the container 110.

The semiconductor electrode 120 is irradiated with light. More specifically, first, the first semiconductor layer 121 is irradiated with the light. Part of the light is absorbed by the first semiconductor layer 121; however, the rest of the light travels through the first semiconductor layer 121 and the light-transmissive conductor layer 122 to reach the second semiconductor layer 123. At least part of the light which has reached the second semiconductor layer 123 is absorbed by the second semiconductor layer 123.

The light-transmissive conductor layer 122 is electrically connected to the counter electrode 130 with a conducting wire 150. The term "counter electrode" used in the instant specification means an electrode capable of receiving electrons from the semiconductor electrode 120 without an electrolyte or an electrode capable of giving electrons to the semiconductor electrode 120 without an electrolyte. The positional relationship between the semiconductor electrode 120 and the counter electrode 130 is not limited, as long as the counter electrode 130 is electrically connected to the light-transmissive conductor layer 122.

First, the present inventors would like to discuss the relationship between an electric current density and an overvoltage in the water splitting reaction using the semiconductor electrode 120 and the counter electrode 130 below.

Electrolysis of water requires a voltage of 1.23 volts theoretically. However, a voltage more than 1.23 volts is required to electrolyze water under a practicable electric current density. An "overvoltage" means a voltage more than a theoretical value. The value of the overvoltage is varied depending on the material used for the electrode. The overvoltage increases with an increase in the density of the electric current flowing through the electrode.

Figure 2:
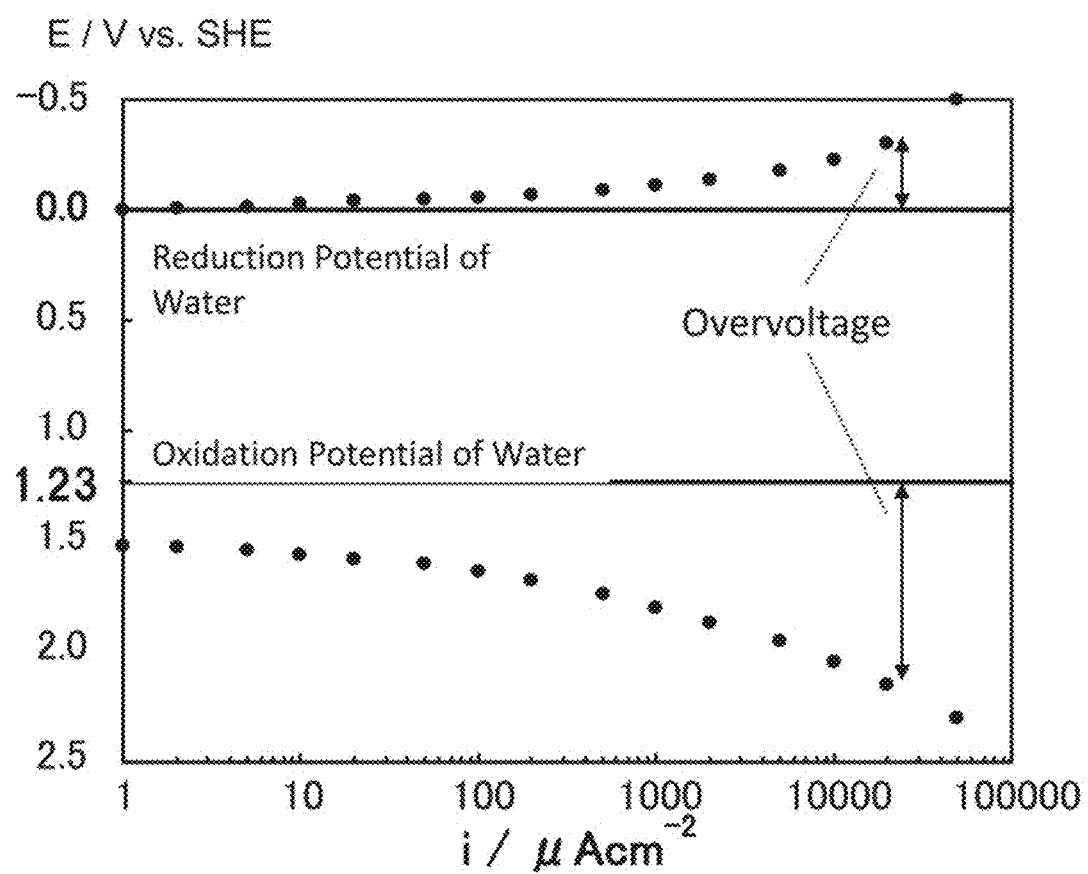
FIG. 2 shows a measurement result of a stationary polarization curve of water splitting using two flat-and-smooth platinum electrodes included in a dilute sulfuric acid aqueous solution.

FIG. 2 shows a measurement result of a stationary polarization curve of water splitting using two flat-and-smooth platinum electrodes included in a dilute sulfuric acid aqueous solution. Since platinum has a high catalytic ability as an electrode for generating hydrogen, hydrogen is generated at a voltage of a theoretical potential. On the other hand, when platinum is used as an electrode for generating oxygen, a voltage more than the theoretical potential, namely, more than 1.23 volts, is required to generate oxygen. In other words, when platinum is used as an electrode for generating oxygen, the overvoltage is high, as is clear from FIG. 2.

Then, the present inventors discuss the relationship between the electric current density and the overvoltage in the hydrogen generation using the semiconductor photoelectrode. The following hypotheses (I)-(III) are supposed true in the following discussion.

Figure 3:
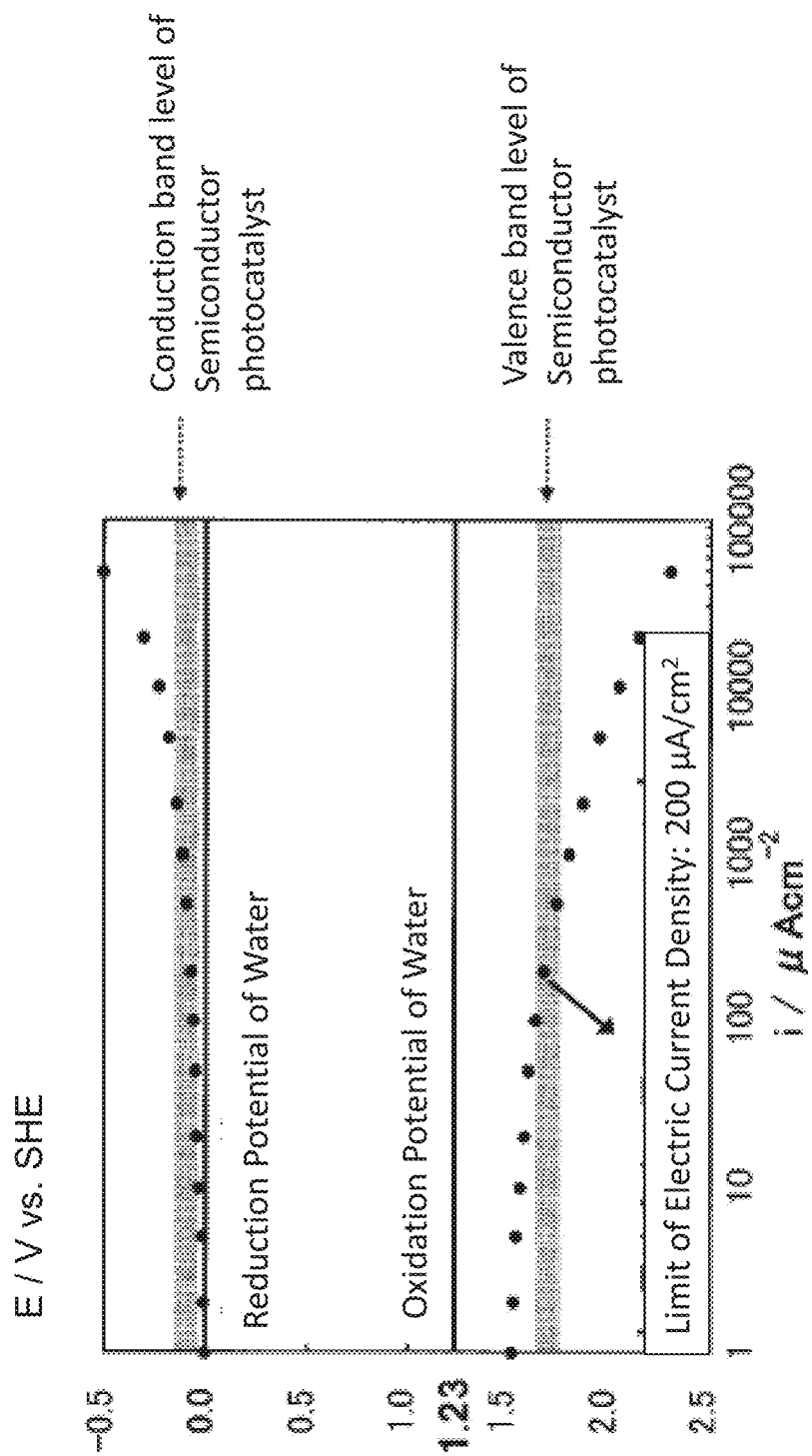
FIG. 3 shows a band structure of a semiconductor photocatalyst used for a semiconductor photoelectrode.

(I) The semiconductor photocatalyst used for the semiconductor photoelectrode has a band structure as shown in FIG. 3.

(II) The semiconductor photocatalyst used for the semiconductor photoelectrode absorbs all solar light having an energy of not less than the bandgap.

(III) All the generated electrons and holes are used for water splitting.

In this case, the obtained electric current density is calculated to be approximately 24 mA/cm$^2$. If the bandgap is supposed to be 1.65 eV (750 nanometers), the obtained electric current is 23.9 mA/cm$^2$. See Smestad, G. P., Krebs, F. C., Lampert, C. M., Granqvist, C. G., Chopra, K. L., Mathew, X., & Takakura, H. "Reporting solar cell efficiencies in Solar Energy Materials and Solar Cells" Solar Energy Materials & Solar Cells, Vol. 92, (2008) 371-373.

Supposing that the semiconductor photocatalyst has a catalytic ability equivalent to that of a platinum electrode, since an energy difference between the valence band level and the oxygen-generating level, which is the oxidation potential of water, corresponds to the overvoltage in the oxygen-generating reaction, the limit of the electric current density in the case where oxygen is generated using a semiconductor photoelectrode including the semiconductor photocatalyst is believed to be approximately 0.2 mA/cm$^2$. Under such circumstances, even when all the light having an energy of not less than the bandgap is absorbed, since the water splitting reaction occurring on the surface of the semiconductor photoelectrode limits the reaction rate, an electric current density of approximately 24 mA/cm$^2$ fails to be obtained.

In order to solve such a problem, in the semiconductor electrode 120, the light-transmissive conductor layer 122 is interposed between the first semiconductor layer 121 and the second semiconductor layer 123. The bandgap of the first semiconductor layer 121 is the same as or wider than the bandgap of the second semiconductor layer 123. Desirably, the first semiconductor layer 121 has a wider bandgap than the second semiconductor layer 123.

The first semiconductor layer 121 having a wider bandgap functions as a plane of incidence of the light. In the present invention, the following mathematical formula (I) is satisfied.

$$\lambda 1 \leq \lambda 2 \tag{I}$$

where

λ1 represents a wavelength of an energy of the light which corresponds to the bandgap of the first semiconductor layer 121, and λ2 represents a wavelength of an energy of the light which corresponds to the bandgap of the second semiconductor layer 123.

Hereinafter, the present inventors would like to suppose that all of the light having an energy of not more than a wavelength which corresponds to the bandgap is absorbed. When the light is incident on the semiconductor electrode 120, the light having a wavelength of not more than λ1 is absorbed by the first semiconductor layer 121. In this way, part of the light is absorbed by the first semiconductor layer 121. On the other hand, the rest of the light travels through the first semiconductor layer 121. In other words, the light having a wavelength more than λ1 passes through the first semiconductor layer 121. Furthermore, the rest of the light, namely, the light having a wavelength more than λ1 passes through the light-transmissive conductor layer 122 to reach the second semiconductor layer 123. The light having a wavelength of more than λ1 and not more than λ2 is absorbed by the second semiconductor layer 123.

As just described, the semiconductor electrode 120 has a stacked structure where the light-transmissive conductor layer 122 is interposed between the first semiconductor layer 121 and the second semiconductor layer 123 which satisfy the mathematical formula (I). This stacked structure allows an electric current to be increased, compared to the case using an electrode formed of a conductor layer and including a semiconductor layer formed only on one surface of the conductor layer. Even if the electric current density reaches a limit of approximately 0.2 mA/cm$^2$ in the second semiconductor layer 123, such a stacked structure allows the electric current to be increased, since the electric current is increased due to absorption of the light by the first semiconductor layer 121. Furthermore, since the semiconductor layers are formed on both surfaces of the light-transmissive conductor layer 122, a reaction surface area is increased to twice or more.

Next, the elements of the photoelectrochemical cell 100 according to the first embodiment will be described.

In the first embodiment, the light-transmissive conductor layer 122 has the front surface and the back surface which are in contact with the first semiconductor layer 121 and the second semiconductor layer 123, respectively. These front and back surfaces are electrically connected to each other with the conducting wire 150.

Figure 4A:
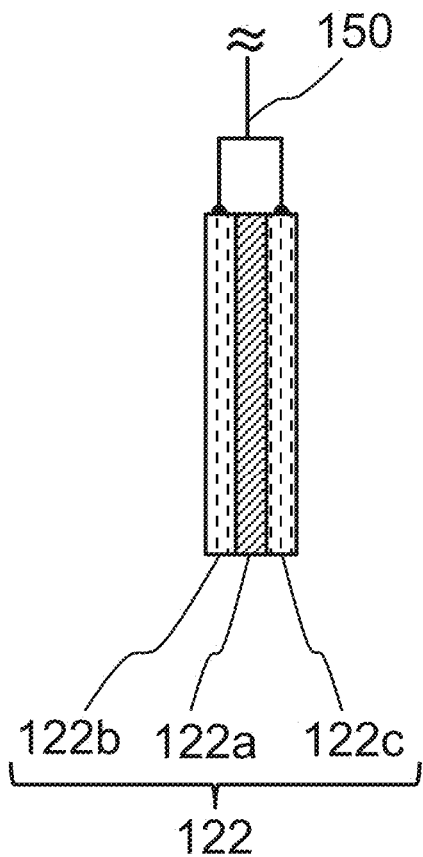
FIG. 4A shows a schematic cross-sectional view of a light-transmissive conductor layer 122 included in a semiconductor electrode 120 used for the photoelectrochemical cell 100 according to the first embodiment.

An example of the simplest light-transmissive conductor layer 122 is a substrate having light-transmissive and conductive properties. Alternatively, as shown in FIG. 4A, the light-transmissive conductor layer 122 may include a light-transmissive and insulative substrate 122a, a first light-transmissive conductive film 122b, and a second light-transmissive conductive film 122c. The first light-transmissive conductive film 122b is formed on one surface of the substrate 122a. The second light-transmissive conductive film 122c is formed on the other surface of the substrate 122a. The first light-transmissive conductive film 122b is electrically connected to the second light-transmissive conductive film 122c with the conducting wire 150. In this way, the light-transmissive conductor layer 122 is obtained.

Figure 4B:
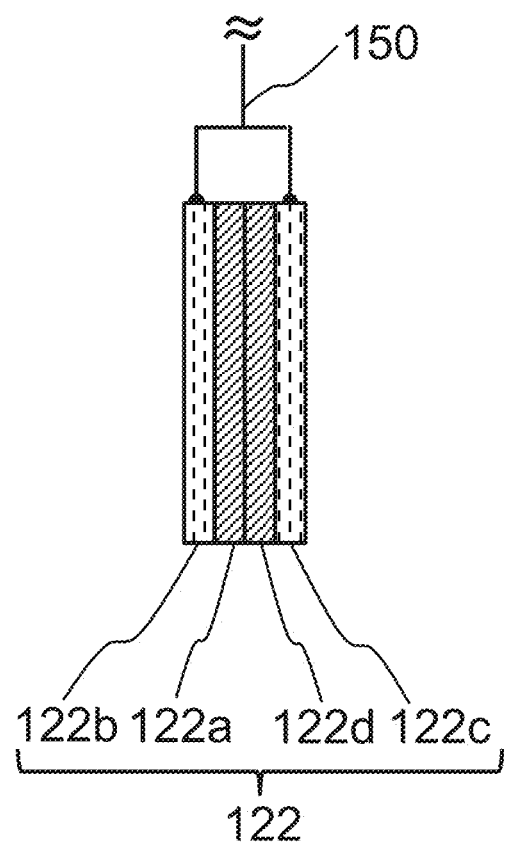
FIG. 4B shows a schematic cross-sectional view of another light-transmissive conductor layer 122 included in a semiconductor electrode 120 used for the photoelectrochemical cell 100 according to the first embodiment.

As shown in FIG. 4B, the light-transmissive conductor layer 122 may include the light-transmissive and insulative first substrate 122a, the first light-transmissive conductive film 122b, a light-transmissive and insulative second substrate 122d, and the second light-transmissive conductive film 122c. The first light-transmissive conductive film 122b is formed on one surface of the first substrate 122a. The second light-transmissive conductive film 122c is formed on one surface of the second substrate 122d. Then, the other surface of the first substrate 122a is adhered to the other surface of the second substrate 122d in such a manner that the light-transmissive property of the first substrate 122a and the second substrate 122d is not impaired. The first light-transmissive conductive film 122b is electrically connected to the second light-transmissive conductive film 122c with the conducting wire 150. In this way, the light-transmissive conductor layer 122 is obtained.

An example of the material of the light-transmissive conductor contained in the light-transmissive conductor layer 122 is indium tin oxide (hereinafter, referred to as "ITO"), fluorine-doped tin oxide (hereinafter, referred to as "FTO"), or antimony-doped tin oxide (hereinafter, referred to as "ATO").

The light-transmissive conductor layer 122 and the first semiconductor layer 121 form an ohmic contact. Similarly, the light-transmissive conductor layer 122 and the second semiconductor layer 123 form an ohmic contact.

As shown in FIG. 3, the first semiconductor layer 121 is formed of a material in which the bandgap thereof (namely, the gap between the energy levels of the top of the valence band and the bottom of the conduction band of the first semiconductor layer 121) overlaps the oxidation-reduction potential of water (namely, hydrogen generation potential and oxygen generation potential). Similarly, the second semiconductor layer 123 is formed of a material in which the bandgap thereof overlaps the oxidation-reduction potential of water. Desirably, the first semiconductor layer 121 is formed of at least one compound selected from the group consisting of a nitride and an oxynitride. It is also desirable that the second semiconductor layer 123 is formed of at least one compound selected from the group consisting of a nitride and an oxynitride. Desirably, the first semiconductor layer 121 is formed of a compound of at least one metal selected from the group consisting of titanium, niobium, and tantalum. It is also desirable that the second semiconductor layer 123 is formed of a compound of at least one metal selected from the group consisting of titanium, niobium, and tantalum.

The following Table 1 shows desirable combinations of the materials of the first semiconductor layer 121 and the second semiconductor layer 123.

TABLE 1

| First semiconductor layer 121 | Second semiconductor layer 123 |
| --- | --- |
| NbON | $Nb_3N_5$ |
| $TiO_2$ | NbON |
| $TiO_2$ | $Nb_3N_5$ |
| $TiO_2$ | TaON |
| $TiO_2$ | $Ta_3N_5$ |
| TaON | $Ta_3N_5$ |
| TaON | NbON |
| TaON | $Nb_3N_5$ |
| $Ta_3N_5$ | $Nb_3N_5$ |

The following Table 2 shows the values of the bandgap of the materials shown in Table 1.

TABLE 2

| Material | Wavelength of light having energy corresponding to bandgap (nanometer) |
| --- | --- |
| $TiO_2$ | 388 |
| TaON | 500 |
| $Ta_3N_5$ | 600 |

TABLE 2-continued

| Material | Wavelength of light having energy corresponding to bandgap (nanometer) |
|---|---|
| NbON | 600 |
| Nb$_3$N$_5$ | 780 |

A material having a small overvoltage may be used as the material of the counter electrode 130. Specifically, the material of the counter electrode 130 may be platinum, gold, silver, nickel, iridium, ruthenium oxide represented by the chemical formula RuO$_2$, or iridium oxide represented by the chemical formula IrO$_2$.

The liquid 140 is an electrolyte aqueous solution or water. An electrolyte aqueous solution is desirable. The electrolyte aqueous solution is either acidic or alkaline. The liquid 140 may be always stored in the container 110. Alternatively, the liquid 140 may be supplied only in use. An example of the electrolyte aqueous solution is dilute sulfuric acid, a sodium sulfate aqueous solution, a sodium carbonate aqueous solution, or a sodium hydrogen carbonate aqueous solution.

Next, the operation of the photoelectrochemical cell 100 according to the first embodiment will be described. First, the photoelectrochemical cell 100 is prepared. In other words, a user of the photoelectrochemical cell 100 gets ready for the photoelectrochemical cell 100.

The semiconductor electrode 120 disposed in the container 110 is irradiated with light through the light-incident part 112. In other words, the user exposes the semiconductor electrode 120 to the light. As just described, first, the first semiconductor layer 121 is irradiated with the light. Part of the light is absorbed by the first semiconductor layer 121. The rest of the light passes through the first semiconductor layer 121 and the light-transmissive conductor layer 122 to reach the second semiconductor layer 123. At least part of the light which has reached the second semiconductor layer 123 is absorbed by the second semiconductor layer 123.

Electrons and holes are generated respectively at the conduction band and the valence band of the part of the first semiconductor layer 121 which has been irradiated with light. Similarly, electrons and holes are generated respectively at the conduction band and the valence band of the part of the second semiconductor layer 123 which has been irradiated with light. When both the first semiconductor layer 121 and the second semiconductor layer 123 are n-type semiconductors, the generated holes transfer to the surfaces of the first semiconductor layer 121 and the second semiconductor layer 123. In this way, as shown in the following reaction formula (II), water splitting occurs on the surfaces of the first semiconductor layer 121 and the second semiconductor layer 123 to generate oxygen.

[Chem 1]

$$4h^+ + 2H_2O \rightarrow O_2\uparrow + 4H^+ \qquad (II)$$

where
h$^+$ represents a hole.

On the other hand, the generated electrons transfer from the first semiconductor layer 121 and the second semiconductor layer 123 to the light-transmissive conductor layer 122. The electrons which have transferred to the light-transmissive conductor layer 122 transfer to the counter electrode 130 through the conducting wire 150. In this way, hydrogen is generated on the surface of the counter electrode 130, as shown in the following reaction formula (III).

[Chem 2]

$$4e^- + 4H^+ \rightarrow 2H_2\uparrow \qquad (III)$$

Second Embodiment

Figure 5:
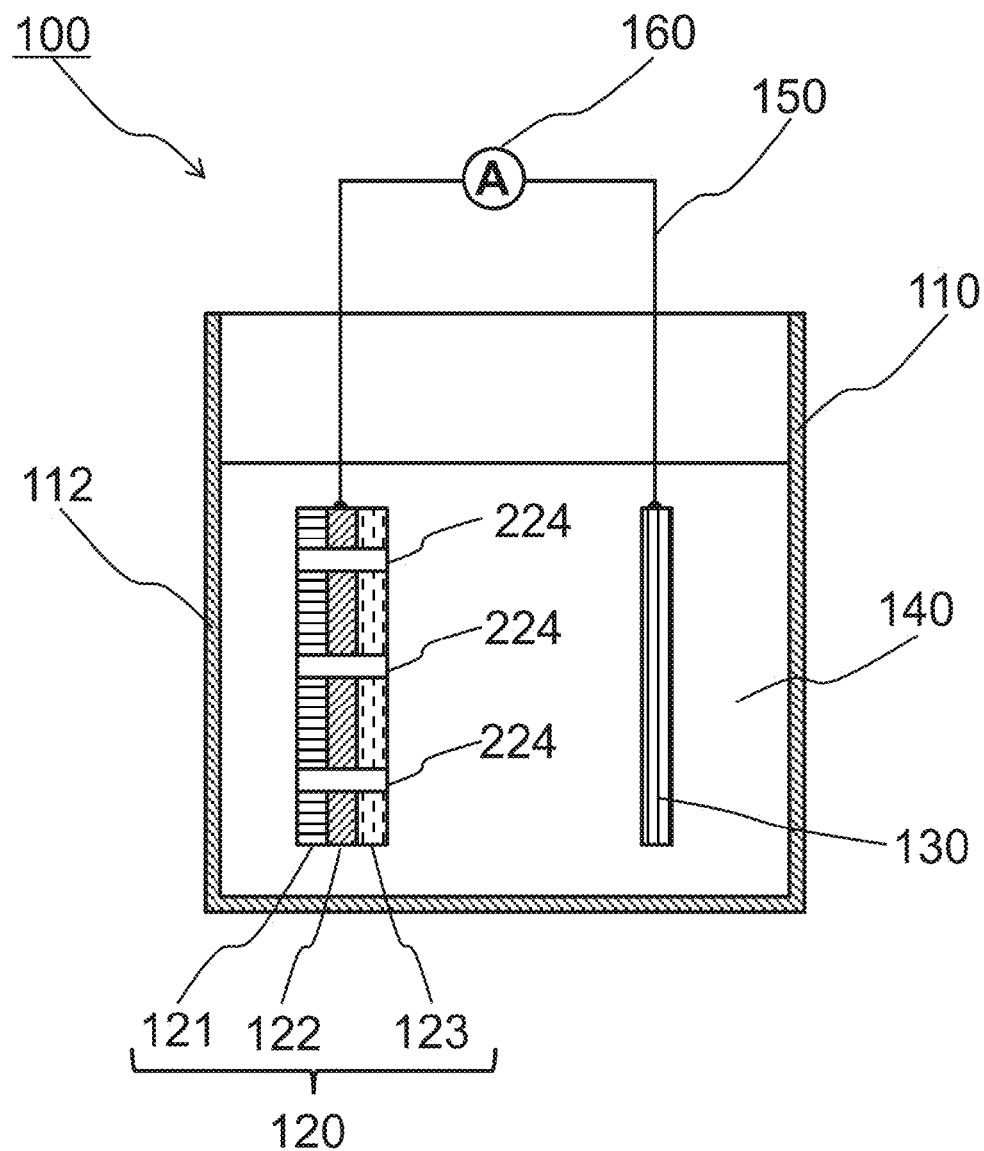
FIG. 5 shows a schematic cross-sectional view of the photoelectrochemical cell 100 according to a second embodiment.

Next, the photoelectrochemical cell 100 according to the second embodiment of the present invention will be described. FIG. 5 shows a schematic cross-sectional view of the photoelectrochemical cell 100 according to the second embodiment.

Similarly to the first embodiment, the semiconductor electrode 120 comprises the light-transmissive conductor layer 122, the first semiconductor layer 121, and the second semiconductor layer 123. As shown in FIG. 5, the semiconductor electrode 120 is provided with a through-hole 224. The through-hole 224 penetrates the first semiconductor layer 121, the light-transmissive conductor layer 122, and the second semiconductor layer 123. Ions transfer from the front surface of the first semiconductor layer 121 to the back surface of the second semiconductor layer 123 through the through-hole 224.

As shown in the reaction formula (II), protons generated on the front surface of the first semiconductor layer 121 reach the counter electrode 130 through the through-hole 224 without wrapping around the semiconductor electrode 120. The transfer distance of the protons between the surface of the first semiconductor layer 121 and the counter electrode 130 is shorter than that of the first embodiment. This allows the efficiency of the water splitting reaction to be improved.

Third Embodiment

Figure 6:
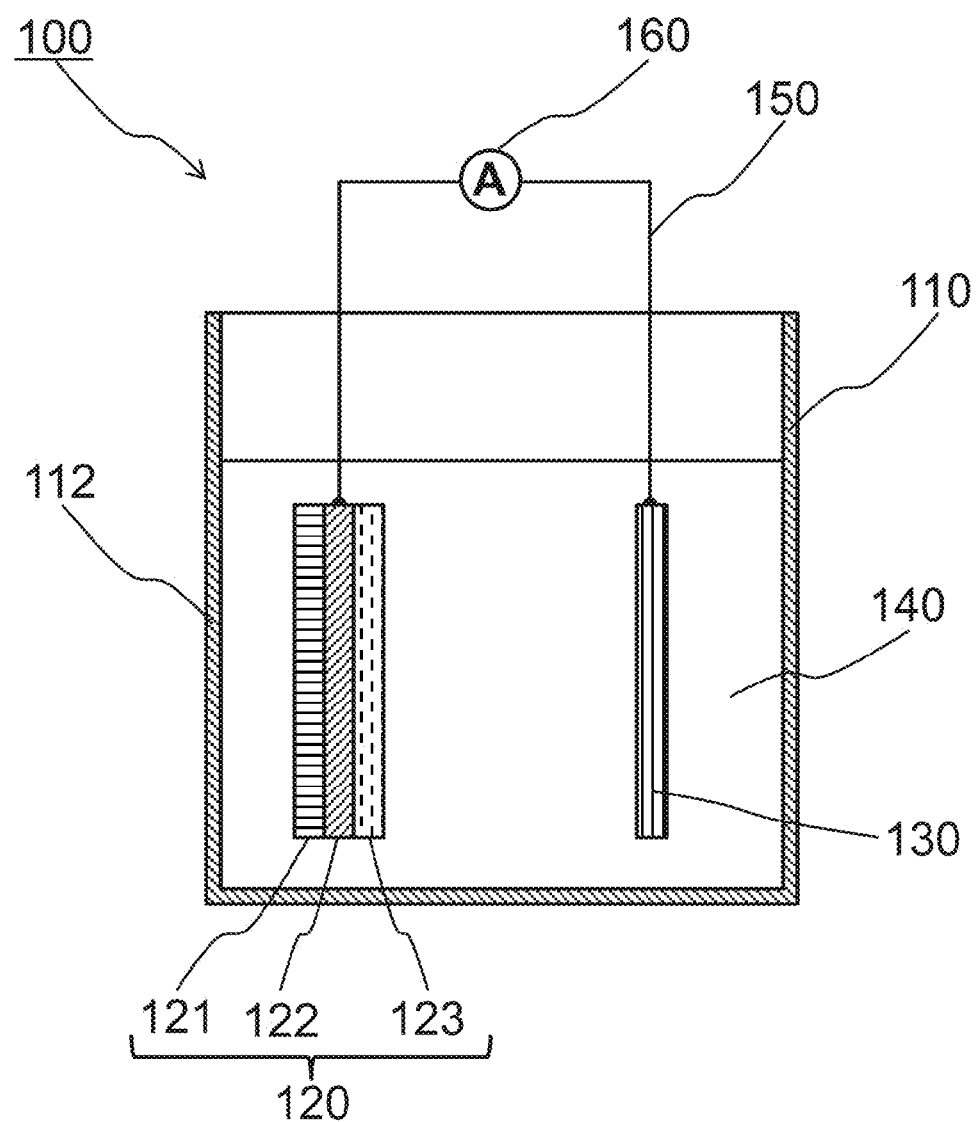
FIG. 6 shows a schematic cross-sectional view of the photoelectrochemical cell 100 according to a third embodiment.

The photoelectrochemical cell 100 according to the third embodiment of the present invention will be described. FIG. 6 shows a schematic cross-sectional view of the photoelectrochemical cell 100 according to the third embodiment.

As shown in FIG. 6, the semiconductor electrode 120 comprises the light-transmissive conductor layer 122, the first semiconductor layer 121, and the second semiconductor layer 123. The first semiconductor layer 121 is formed on the front surface of the light-transmissive conductor layer 122. The second semiconductor layer 123 is formed on the back surface of the light-transmissive conductor layer 122.

Figure 7A:
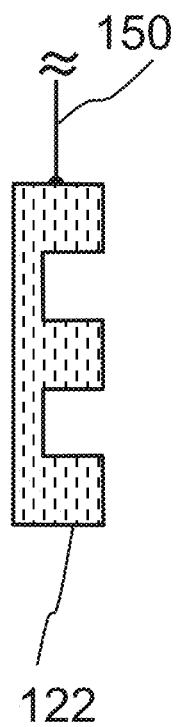
FIG. 7A shows a schematic cross-sectional view of the light-transmissive conductor layer 122 included in the semiconductor electrode 120 used for the photoelectrochemical cell 100 according to the third embodiment.
Figure 7B:
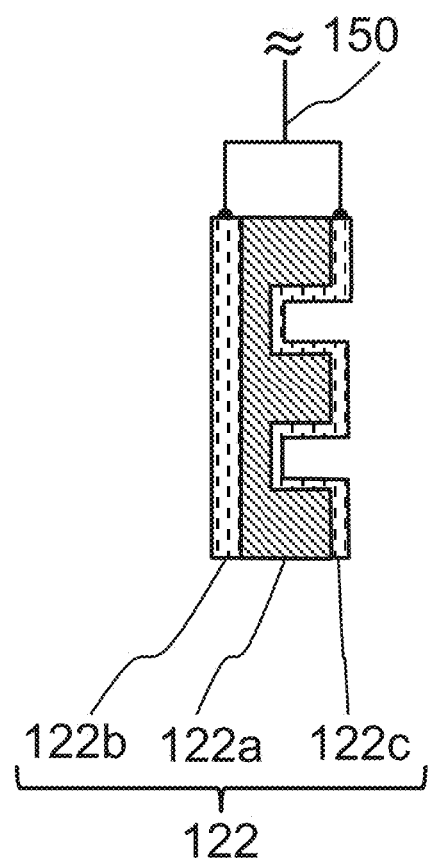
FIG. 7B shows a schematic cross-sectional view of another light-transmissive conductor layer 122 included in the semiconductor electrode 120 used for the photoelectrochemical cell 100 according to the third embodiment.
Figure 7C:
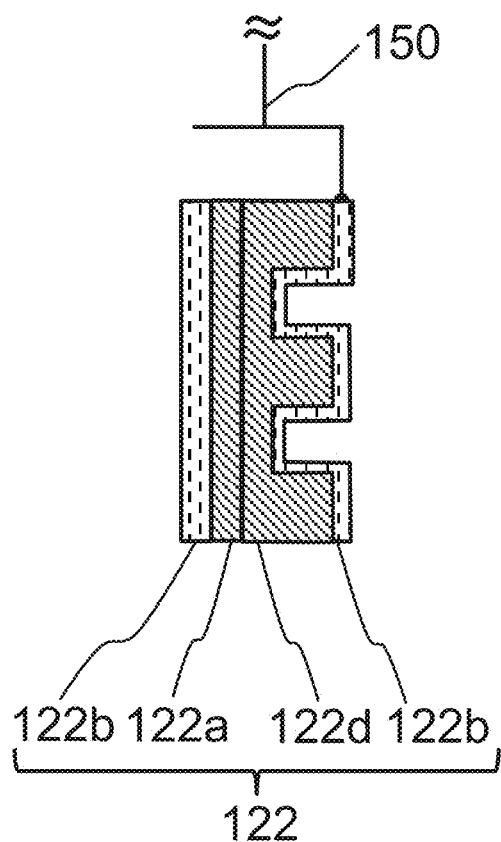
FIG. 7C shows a schematic cross-sectional view of still another light-transmissive conductor layer 122 included in the semiconductor electrode 120 used for the photoelectrochemical cell 100 according to the third embodiment.

As shown in FIGS. 7A-7C, the light-transmissive conductor layer 122 has a pillar protrusion or a groove on the back surface thereof. Desirably, a plurality of pillar protrusions or a plurality of grooves are formed. The second semiconductor layer 123 has an uneven structure which corresponds to the pillar protrusion or the groove.

An example of the simplest light-transmissive conductor layer 122 shown in FIG. 7A is a light-transmissive and conductive substrate having the pillar protrusions or the grooves on one surface. Alternatively, the light-transmissive conductor layer 122 shown in FIG. 7B includes the light-transmissive and insulative substrate 122a, the first light-transmissive conductive film 122b, and the second light-transmissive conductive film 122c. The substrate 122a has the pillar protrusion or the groove on one surface thereof. The second light-transmissive conductive film 122c has the uneven structure which corresponds to the pillar protrusion or the groove formed on one surface of the substrate 122a. The first light-transmissive conductive film 122b is electrically connected to the second light-transmissive conductive film 122c with the conducting wire 150.

The light-transmissive conductor layer 122 shown in FIG. 7C includes the light-transmissive and insulative first substrate 122a, the first light-transmissive conductive film 122b, the light-transmissive and insulative second substrate 122d, and the second light-transmissive conductive film 122c. The second substrate 122d has the pillar protrusion or the groove on one surface thereof. The second light-transmissive conductive film 122c has an uneven structure which corresponds to the pillar protrusion or the groove formed on one surface of the second substrate 122d. Similarly to the light-transmissive conductor layer 122 shown in FIG. 4B, the first light-transmissive conductive film 122b is formed on one surface of the first substrate 122a. The second light-transmissive conductive film 122c is formed on one surface of the second substrate 122d. Then, the other surface of the first substrate 122a is adhered to the other surface of the second substrate 122d in such a manner that the light-transmissive property of the first substrate 122a and the second substrate 122d is not impaired. The first light-transmissive conductive film 122b is electrically connected to the second light-transmissive conductive film 122c with the conducting wire 150. In this way, the light-transmissive conductor layer 122 is obtained.

The light-transmissive conductor layer 122 shown in FIGS. 7A-7C has a larger surface area than the light-transmissive conductor layer 122 shown in FIGS. 4A-4B. For this reason, the electric current density is higher in the case where the light-transmissive conductor layer 122 shown in FIGS. 7A-7C is used, compared to the case where the light-transmissive conductor layer 122 shown in FIGS. 4A-4B is used.

EXAMPLES

The present invention will be described below in more detail with reference to the examples.

Inventive Example 1

In the inventive example 1, the photoelectrochemical cell 100 shown in FIG. 1 was fabricated. The photoelectrochemical cell 100 according to the inventive example 1 comprised the cuboid container 110, the semiconductor electrode 120, and the counter electrode 130. The container 110 had an opening at the upper part thereof and was made of glass. An $H_2SO_4$ aqueous solution of 0.1 mol/L was stored in the container 110 as the liquid 140.

In the inventive example 1, the semiconductor electrode 120 comprising the light-transmissive conductor layer 122 shown in FIG. 4B was fabricated by the following procedure. First, two sapphire substrates were prepared as the first substrate 122a and the second substrate 122d. Each of the sapphire substrates had a size of 50 millimeters×10 millimeters×0.5 millimeters.

The first light-transmissive conductive film 122b made of ATO having a thickness of 150 nanometers was formed by a sputtering method on the front surface of the first substrate 122a. Similarly, the second light-transmissive conductive film 122c made of ATO having a thickness of 150 nanometers was formed by a sputtering method on the back surface of the second substrate 122d.

The first semiconductor layer 121 formed of niobium oxynitride represented by the chemical formula NbON was formed by a sputtering method on the first light-transmissive conductive film 122b formed on the front surface of the first substrate 122a, based on the disclosure included in United States Patent Application Pre-Grant Publication No. 2013/0192984, which is herein incorporated by reference. The first semiconductor layer 121 had a thickness of 100 nanometers. In the sputtering, a metal mask having a size of 10 millimeters×10 millimeters was formed on the first light-transmissive conductive film 122b. The metal mask was removed after the sputtering to expose a part of the first semiconductor layer 121.

The second semiconductor layer 123 formed of niobium nitride represented by the chemical formula $Nb_3N_5$ was formed by a sputtering method on the back surface of the second light-transmissive conductive film 122c formed on the back surface of the second substrate 122d, based on the disclosure included in United States Patent Application Pre-Grant Publication No. 2014/0057187, which is herein incorporated by reference. The second semiconductor layer 123 had a thickness of 100 nanometers. In the sputtering, a metal mask having a size of 10 millimeters×10 millimeters was formed on the second light-transmissive conductive film 122c. The metal mask was removed after the sputtering to expose a part of the second semiconductor layer 123. The exposed parts of the first semiconductor layer 121 and the second semiconductor layer 123 were electrically connected to each other with the conducting wire 150.

The back surface of the first substrate 122a was adhered to the front surface of the second substrate 122d. In this way, the semiconductor electrode 120 shown in FIG. 4B was fabricated.

Niobium oxynitride represented by the chemical formula NbON has a bandgap of 2.1 eV (600 nanometers). Niobium nitride represented by the chemical formula $Nb_3N_5$ has a bandgap of 1.6 eV (780 nanometers).

Then, as shown in FIG. 1, the fabricated semiconductor electrode 120 was immersed in the liquid 140 in such a manner that the front surface of the first semiconductor layer 121 was opposite to the light-incident part 112 of the container 110. As the counter electrode 130, a platinum plate was used. The light-transmissive conductor layer 122 made of ATO was electrically connected to the counter electrode 130 with the conducting wire 150. In this way, the photoelectrochemical cell 100 was fabricated.

The first semiconductor layer 121 of the photoelectrochemical cell 100 was irradiated with pseudo sunlight through the light-incident part 112. As the pseudo sunlight, a solar simulator (available from Seric Ltd., Trade name: XC-100) was used. Specifically, the front surface of the first semiconductor layer 121 was irradiated with the light having an intensity of 1 kW/m², and the density of a photocurrent flowing between the semiconductor electrode 120 and the counter electrode 130 was measured with an ammeter 160. The measured photocurrent density is shown in Table 3, which will be described later.

Inventive Example 2

In the inventive example 2, an experiment similar to the inventive example 1 was performed, except that the first semiconductor layer 121 and the second semiconductor layer 123 were formed of titanium oxide represented by the chemical formula $TiO_2$ and niobium oxynitride represented by the chemical formula NbON, respectively. Titanium oxide represented by the chemical formula $TiO_2$ has a bandgap of 3.2 eV (388 nanometers).

Inventive Example 3

In the inventive example 3, the photoelectrochemical cell 100 shown in FIG. 6 was fabricated. The photoelectrochemical cell 100 according to the inventive example 3 comprised the cuboid container 110, the semiconductor electrode 120, and the counter electrode 130. The container 110 had an opening at the upper part thereof and was made of glass. An $H_2SO_4$ aqueous solution of 0.1 mol/L was stored in the container 110 as the liquid 140.

In the inventive example 3, the semiconductor electrode 120 comprising the light-transmissive conductor layer 122 shown in FIG. 7C was fabricated by the following procedure. First, similarly to the case of the inventive example 1, the first substrate 122a was prepared. Unlike the case of the inventive example 1, a sapphire substrate having a plurality of grooves on the surface thereof was prepared as the second substrate 122d. Each groove had a depth of 2 micrometers and a width of 3 micrometers. This sapphire substrate had a size of 50 millimeters×10 millimeters×0.5 millimeters.

The first light-transmissive conductive film 122b made of ATO having a thickness of 150 nanometers was formed by a sputtering method on the front surface of the first substrate 122a. Similarly, the second light-transmissive conductive film 122c made of ATO having a thickness of 150 nanometers was formed by a sputtering method on the back surface of the second substrate 122d. The second light-transmissive conductive film 122c had the uneven structure which corresponded to the grooves formed on the surface of the second substrate 122d.

Then, similarly to the case of the inventive example 1, the first semiconductor layer 121 formed of niobium oxynitride represented by the chemical formula NbON was formed on the front surface of the first substrate 122a. The second semiconductor layer 123 formed of niobium nitride represented by the chemical formula $Nb_3N_5$ was formed on the back surface of the second substrate 122d. Similarly to the second light-transmissive conductive film 122c, the second semiconductor layer 123 had the uneven structure which corresponded to the grooves formed on the surface of the second substrate 122d.

Furthermore, the back surface of the first substrate 122a was adhered to the front surface of the second substrate 122d. In this way, the semiconductor electrode 120 comprising the light-transmissive conductor layer 122 shown in FIG. 7C was fabricated.

Since the second semiconductor layer 123 of the semiconductor electrode 120 according to the inventive example 3 had the uneven structure, the second semiconductor layer 123 of the semiconductor electrode 120 according to the inventive example 3 had 2.3 times as large surface area as that of the inventive example 1.

The photoelectrochemical cell 100 was fabricated with the semiconductor electrode 120 according to the inventive example 3 similarly to the inventive example 1. The first semiconductor layer 121 was irradiated with the pseudo sunlight through the light-incident part 112.

Comparative Example 1-1

In the comparative example 1-1, an experiment similar to the inventive example 1 was performed, except that the first semiconductor layer 121 made of niobium oxynitride represented by the chemical formula NbON was not formed.

Comparative Example 1-2

In the comparative example 1-2, an experiment similar to the inventive example 1 was performed, except that the second semiconductor layer 123 made of niobium nitride represented by the chemical formula $Nb_3N_5$ was not formed.

Comparative Example 2 hi the comparative example 2, an experiment similar to the inventive example 2 was performed, except that the second semiconductor layer 123 made of niobium oxynitride represented by the chemical formula NbON was not formed.

TABLE 3

| | | First Semiconductor Layer | Second Semiconductor Layer | Area Ratio | Photo-current Density [$\mu A/cm^2$] |
|---|---|---|---|---|---|
| Inventive example 1 | Materials | NbON | $Nb_3N_5$ | 1 | 7.8 |
| | Bandgap [eV] | 2.1 | 1.6 | | |
| | Wavelength corresponding to Bandgap | 600 nm | 780 nm | | |
| Comparative example 1-1 | Materials | — | $Nb_3N_5$ | 0.5 | 6.3 |
| | Bandgap [eV] | — | 1.6 | | |
| | Wavelength corresponding to Bandgap | | 780 nm | | |
| Comparative example 1-2 | Materials | NbON | — | 0.5 | 4.8 |
| | Bandgap [eV] | 2.1 | — | | |
| | Wavelength corresponding to Bandgap | 600 nm | | | |
| Inventive example 2 | Materials | $TiO_2$ | NbON | 1 | 6.5 |
| | Bandgap [eV] | 3.2 | 2.1 | | |
| | Wavelength corresponding to Bandgap | 388 nm | 600 nm | | |
| Comparative example 2 | Materials | $TiO_2$ | — | 0.5 | 3.9 |
| | Bandgap [eV] | 3.2 | — | | |
| | Wavelength corresponding to Bandgap | 388 nm | | | |
| Inventive example 3 | Materials | NbON | $Nb_3N_5$ | 2.3 | 10.1 |
| | Bandgap [eV] | 2.2 | 1.6 | | |
| | Wavelength corresponding to Bandgap | 600 nm | | | |

The following matters would be obvious from Table 3. The photocurrent density measured in the inventive example 1, the inventive example 2, and the inventive example 3 was higher than the photocurrent density measured in the comparative example 1-1, the comparative example 1-2, and the comparative example 2. This is because at least part of the light having a wavelength of not more than the wavelength λ1 was absorbed by the first semiconductor layer 121, and at least part of the light having a wavelength of more than the wavelength λ1 and not more than the wavelength λ2 was absorbed by the second semiconductor layer 123, and as a result, the electric current density was increased. In other words, first, the first semiconductor layer 121 absorbed at least part of the light having a wavelength of not more than the wavelength λ1 of the energy of the light which corresponded to the bandgap of the first semiconductor layer 121. Then, the second the semiconductor layer 123 absorbed at least part of the light having a wavelength of not less than the wavelength λ1 and not more than the wavelength λ2 of the energy of the light which corresponded to the bandgap of the second semiconductor layer 123.

More specifically, in the inventive example 1, the light having a wavelength of not more than 600 nanometers was absorbed by the first semiconductor layer 121 formed of niobium oxynitride represented by the chemical formula NbON. The light having a wavelength of more than 600 nanometers and not more than 780 nanometers passed through the first semiconductor layer 121 and the light-transmissive conductor layer 122. The light which had passed through the first semiconductor layer 121 and the light-transmissive conductor layer 122 was absorbed by the second semiconductor layer 123 formed of niobium nitride represented by the chemical formula $Nb_3N_5$.

Similarly, in the inventive example 2, the light having a wavelength of not more than 388 nanometers was absorbed by the first semiconductor layer 121 formed of titanium oxide represented by the chemical formula $TiO_2$. The light having a wavelength of more than 388 nanometers and not more than 600 nanometers passed through the first semiconductor layer 121 and the light-transmissive conductor layer 122. The light which had passed through the first semiconductor layer 121 and the light-transmissive conductor layer 122 was absorbed by the second semiconductor layer 123 formed of niobium oxynitride represented by the chemical formula NbON.

Niobium oxynitride represented by the chemical formula NbON has lower quantum efficiency than niobium nitride represented by the chemical formula $Nb_3N_5$. However, as understood from the comparison of the inventive example 2 to the comparative example 1-1, the electric current density in the case where niobium oxynitride represented by the chemical formula NbON was used together with titanium oxide represented by the chemical formula $TiO_2$ was higher than the electric current density in the case where only niobium nitride represented by the chemical formula $Nb_3N_5$ was used.

As is clear from the inventive example 3, the electric current density increases with an increase in the surface area provided by the uneven structure.

Comparative Example 3

Figure 8:
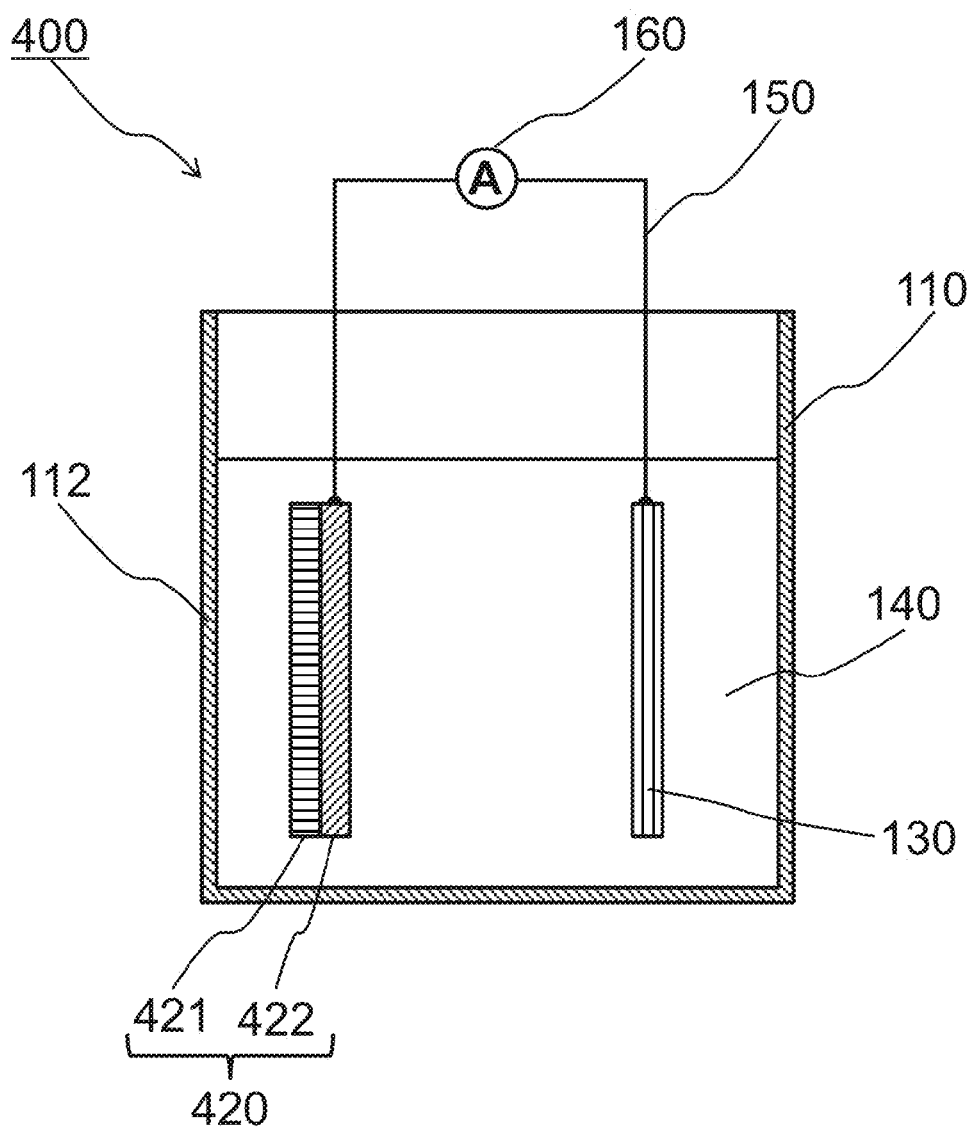
FIG. 8 shows a schematic cross-sectional view of a photoelectrochemical cell 100 according to the comparative example 3.
Figure 9:
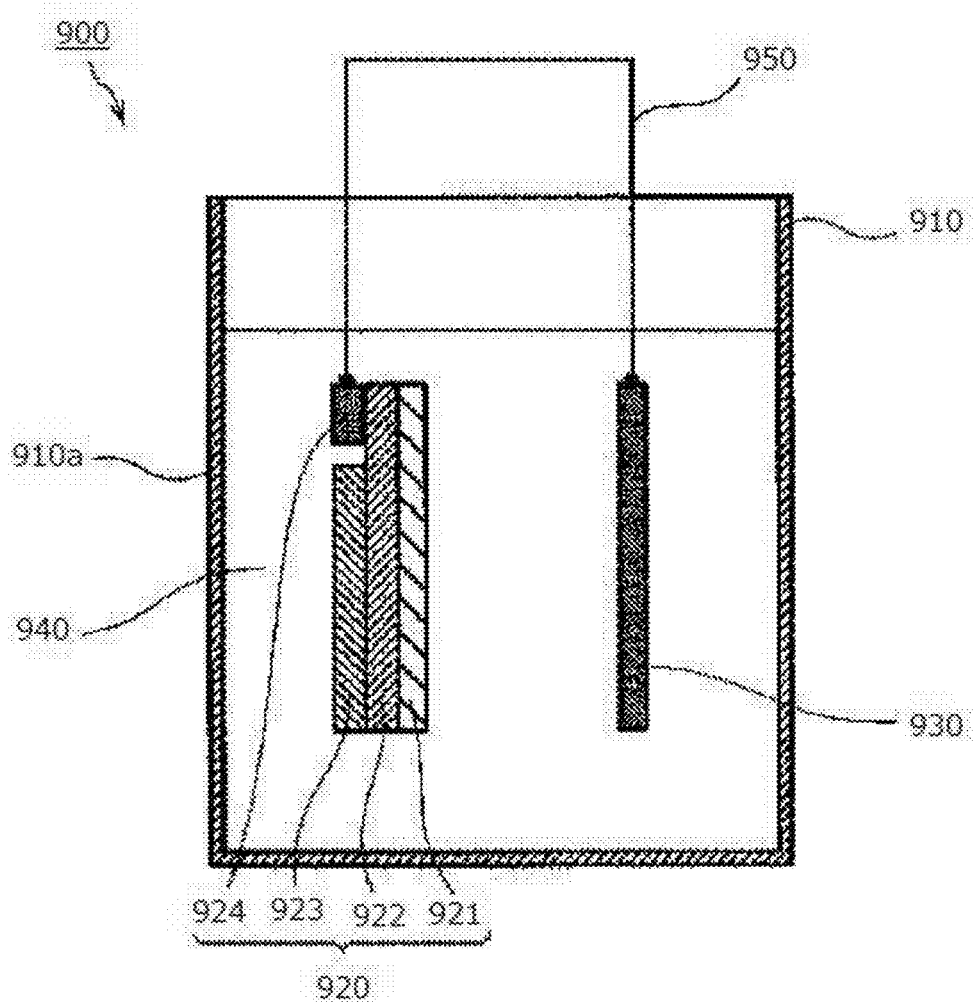
FIG. 9 shows a schematic cross-sectional view of the photoelectrochemical cell 900 disclosed in United States Patent Application Pre-Grand Publication No. 2012/0028141.

In the comparative example 3, a photoelectrochemical cell 400 having a semiconductor electrode 420 shown in FIG. 8 was fabricated. The photoelectrochemical cell 400 according to the comparative example 3 was same as the photoelectrochemical cell 100 according to the inventive example 1, except that the following semiconductor electrode 420 was used in place of the semiconductor electrode 120.

In the comparative example 3, the semiconductor electrode 420 was fabricated by the following procedure. The semiconductor electrode 420 included a conductor 422 and a semiconductor layer 421 formed on the conductor 422. As the conductor 422, a gold plate was used. This gold plate had a size of 50 millimeters×10 millimeters×0.5 millimeters. The semiconductor layer 421 formed of niobium nitride represented by the chemical formula $Nb_3N_5$ was formed by an MOCVD method on the conductor 422. The semiconductor 421 had a thickness of 100 nanometers. In the MOCVD method, a metal mask having a size of 10 millimeters×10 millimeters was formed on the conductor 422. The metal mask was removed after the MOCVD method to expose a part of the conductor 422. In this way, the semiconductor electrode 420 was fabricated.

Then, the fabricated semiconductor electrode 420 was stored in the container 110 in such a manner that the surface of the semiconductor layer 421 was opposite to the light-incident part 112. As the counter electrode 130, a platinum plate was used. The exposed part of the conductor 422 was electrically connected to the counter electrode 130 with the conducting wire 150. In this way, the photoelectrochemical cell 400 was fabricated.

Similarly to the case of the inventive example 1, the semiconductor layer 421 of the fabricated photoelectrochemical cell 400 was irradiated with the pseudo sunlight through the light-incident part 112. However, little photocurrent was detected. It was believed that this was because gold and niobium nitride represented by the chemical formula $Nb_3N_5$ formed the Schottky junction. In other words, it was believed the Schottky junction prevented electrons from transferring between gold and niobium nitride represented by the chemical formula $Nb_3N_5$. On the other hand, in all of the inventive examples and the comparative examples other than the comparative example 3, the photocurrent was measured. Accordingly, it was believed that the semiconductors used in all of the inventive examples and the comparative examples other than the comparative example 3 formed an ohmic contact with ATO.

INDUSTRIAL APPLICABILITY

The present invention is useful for an energy system such as a hydrogen generation device for water splitting.

REFERENCE SIGNS LIST 100 photoelectrochemical cell
110 container
112 light-incident part
120 semiconductor electrode
121 first semiconductor layer
122 light-transmissive conductor layer
122a first substrate
122b first light-transmissive conductive film
122c second light-transmissive conductive film
122d second substrate
123 second semiconductor layer
130 counter electrode
140 liquid
150 conducting wire
160 ammeter
224 through-hole
420 semiconductor electrode
421 semiconductor layer
422 conductor

The invention claimed is:
1. A method for generating hydrogen by water splitting, the method comprising:
(a) preparing a photoelectrochemical cell comprising:
a container;
a liquid stored in the container;
a semiconductor electrode contained in the container; and
a counter electrode contained in the container, wherein the semiconductor electrode comprises:
a first semiconductor layer;
a light-transmissive conductor layer; and
a second semiconductor layer;
the light-transmissive conductor layer is interposed between the first semiconductor layer and the second semiconductor layer;
the light-transmissive conductor layer and the first semiconductor layer form an ohmic contact;
the light-transmissive conductor layer and the second semiconductor layer form an ohmic contact;
a bandgap of the first semiconductor layer is equal to or wider than a bandgap of the second semiconductor layer;
the first semiconductor layer is in contact with the liquid;
the second semiconductor layer is in contact with the liquid;
the counter electrode is in contact with the liquid;
the counter electrode is electrically connected to the light-transmissive conductor layer; and the liquid is an electrolyte aqueous solution or water; and (b) generating hydrogen on the counter electrode by irradiating the first semiconductor layer with light in such a manner that the light which has travelled through the first semiconductor layer reaches the second semiconductor layer through the light-transmissive conductor layer.

2. The method according to claim 1, wherein the bandgap of the first semiconductor layer is wider than the bandgap of the second semiconductor layer.

3. The method according to claim 1, wherein the first semiconductor layer is formed of at least one compound selected from the group consisting of a nitride and an oxynitride.

4. The method according to claim 1, wherein the second semiconductor layer is formed of at least one compound selected from the group consisting of a nitride and an oxynitride.

5. The method according to claim 1, wherein the first semiconductor layer is formed of a compound of at least one metal selected from the group consisting of titanium, niobium, and tantalum.

6. The method according to claim 1, wherein the second semiconductor layer is formed of a compound of at least one metal selected from the group consisting of titanium, niobium, and tantalum.

7. The method according to claim 1, wherein the first semiconductor layer and the second semiconductor layer are formed of a combination of materials shown in the following:

| First semiconductor layer | Second semiconductor layer |
|---|---|
| NbON | $Nb_3N_5$ |
| $TiO_2$ | NbON |
| $TiO_2$ | $Nb_3N_5$ |
| $TiO_2$ | TaON |
| $TiO_2$ | $Ta_3N_5$ |
| TaON | $Ta_3N_5$ |
| TaON | NbON |
| TaON | $Nb_3N_5$ |
| $Ta_3N_5$ | $Nb_3N_5$. |

8. The method according to claim 1, wherein
the first semiconductor layer is formed of niobium oxynitride represented by a chemical formula NbON; and
the second semiconductor layer is formed of niobium nitride represented by a chemical formula $Nb_3N_5$.

9. The method according to claim 1, wherein
the first semiconductor layer is formed of titanium oxide represented by a chemical formula $TiO_2$; and
the second semiconductor layer is formed of niobium oxynitride represented by a chemical formula NbON.

10. The method according to claim 1, wherein the light-transmissive conductor layer is formed of an oxide.

11. The method according to claim 10, wherein the oxide is at least one light-transmissive conductive material selected from the group consisting of indium tin oxide, fluorine-doped tin oxide, and antimony-doped tin oxide.

12. The method according to claim 1, wherein the light-transmissive conductor layer is formed of a stacked structure including a first light-transmissive conductive film and a second light-transmissive conductive film.

13. The method according to claim 1, wherein
the light-transmissive conductor layer has a plurality of pillar protrusions or a plurality of grooves on a surface which is in contact with the second semiconductor layer; and
the second semiconductor layer has an uneven structure which corresponds to the plurality of pillar protrusions or the plurality of grooves.

14. The method according to claim 1, wherein the semiconductor electrode comprises a through-hole which penetrates the first semiconductor layer, the light-transmissive conductor layer, and the second semiconductor layer.

15. A photoelectrochemical cell used for generating hydrogen by water splitting, the photoelectrochemical cell comprising:
a container;
a liquid stored in the container;
a semiconductor electrode contained in the container; and
a counter electrode contained in the container,
wherein
the semiconductor electrode comprises:
a first semiconductor layer;
a light-transmissive conductor layer; and
a second semiconductor layer;
the light-transmissive conductor layer is interposed between the first semiconductor layer and the second semiconductor layer;
the light-transmissive conductor layer and the first semiconductor layer form an ohmic contact;
the light-transmissive conductor layer and the second semiconductor layer form an ohmic contact;
a bandgap of the first semiconductor layer is equal to or wider than a bandgap of the second semiconductor layer;
the first semiconductor layer is in contact with the liquid;
the second semiconductor layer is in contact with the liquid;
the counter electrode is in contact with the liquid;
the counter electrode is electrically connected to the light-transmissive conductor layer; and
the liquid is an electrolyte aqueous solution or water.

16. The photoelectrochemical cell according to claim 15, wherein the bandgap of the first semiconductor layer is wider than the bandgap of the second semiconductor layer.

17. The photoelectrochemical cell according to claim 15, wherein the first semiconductor layer is formed of at least one compound selected from the group consisting of a nitride and an oxynitride.

18. The photoelectrochemical cell according to claim 15, wherein the second semiconductor layer is formed of at least one compound selected from the group consisting of a nitride and an oxynitride.

19. The photoelectrochemical cell according to claim 15, wherein the first semiconductor layer is formed of a compound of at least one metal selected from the group consisting of titanium, niobium, and tantalum.

20. The photoelectrochemical cell according to claim 15, wherein the second semiconductor layer is formed of a compound of at least one metal selected from the group consisting of titanium, niobium, and tantalum.

21. The photoelectrochemical cell according to claim 15, wherein the first semiconductor layer and the second semiconductor layer are formed of a combination of materials shown in the following:

| First semiconductor layer | Second semiconductor layer |
|---|---|
| NbON | $Nb_3N_5$ |
| $TiO_2$ | NbON |
| $TiO_2$ | $Nb_3N_5$ |
| $TiO_2$ | TaON |

| First semiconductor layer | Second semiconductor layer |
|---|---|
| $TiO_2$ | $Ta_3N_5$ |
| TaON | $Ta_3N_5$ |
| TaON | NbON |
| TaON | $Nb_3N_5$ |
| $Ta_3N_5$ | $Nb_3N_5$. |

22. The photoelectrochemical cell according to claim 15, wherein
the first semiconductor layer is formed of niobium oxynitride represented by a chemical formula NbON; and
the second semiconductor layer is formed of niobium nitride represented by a chemical formula $Nb_3N_5$.

23. The photoelectrochemical cell according to claim 15, wherein
the first semiconductor layer is formed of titanium oxide represented by a chemical formula $TiO_2$; and
the second semiconductor layer is formed of niobium oxynitride represented by a chemical formula NbON.

24. The photoelectrochemical cell according to claim 15, wherein the light-transmissive conductor layer is formed of an oxide.

25. The photoelectrochemical cell according to claim 24, wherein the oxide is at least one light-transmissive conductive material selected from the group consisting of indium tin oxide, fluorine-doped tin oxide, and antimony-doped tin oxide.

26. The photoelectrochemical cell according to claim 15, wherein the light-transmissive conductor layer is formed of a stacked structure including a first light-transmissive conductive film and a second light-transmissive conductive film.

27. The photoelectrochemical cell according to claim 15, wherein
the light-transmissive conductor layer has a plurality of pillar protrusions or a plurality of grooves on a surface which is in contact with the second semiconductor layer; and
the second semiconductor layer has an uneven structure which corresponds to the plurality of pillar protrusions or the plurality of grooves.

28. The photoelectrochemical cell according to claim 15, wherein the semiconductor electrode comprises a through-hole which penetrates the first semiconductor layer, the light-transmissive conductor layer, and the second semiconductor layer.

29. A semiconductor electrode used for generating hydrogen by water splitting, the semiconductor electrode comprising:
a first semiconductor layer;
a light-transmissive conductor layer; and
a second semiconductor layer,
wherein
the light-transmissive conductor layer is interposed between the first semiconductor layer and the second semiconductor layer;
the light-transmissive conductor layer and the first semiconductor layer form an ohmic contact;
the light-transmissive conductor layer and the second semiconductor layer form an ohmic contact; and
a bandgap of the first semiconductor layer is equal to or wider than a bandgap of the second semiconductor layer.

30. The semiconductor electrode according to claim 29, wherein the bandgap of the first semiconductor layer is wider than the bandgap of the second semiconductor layer.

31. The semiconductor electrode according to claim 29, wherein the first semiconductor layer is formed of at least one compound selected from the group consisting of a nitride and an oxynitride.

32. The semiconductor electrode according to claim 29, wherein the second semiconductor layer is formed of at least one compound selected from the group consisting of a nitride and an oxynitride.

33. The semiconductor electrode according to claim 29, wherein the first semiconductor layer is formed of a compound of al least one metal selected from the group consisting of titanium, niobium, and tantalum.

34. The semiconductor electrode according to claim 29, wherein the second semiconductor layer is formed of a compound of at least one metal selected from the group consisting of titanium, niobium, and tantalum.

35. The semiconductor electrode according to claim 29, wherein the first semiconductor layer and the second semiconductor layer are formed of a combination of materials shown in the following:

| First semiconductor layer | Second semiconductor layer |
|---|---|
| NbON | $Nb_3N_5$ |
| $TiO_2$ | NbON |
| $TiO_2$ | $Nb_3N_5$ |
| $TiO_2$ | TaON |
| $TiO_2$ | $Ta_3N_5$ |
| TaON | $Ta_3N_5$ |
| TaON | NbON |
| TaON | $Nb_3N_5$ |
| $Ta_3N_5$ | $Nb_3N_5$. |

36. The semiconductor electrode according to claim 29, wherein
the first semiconductor layer is formed of niobium oxynitride represented by a chemical formula NbON; and
the second semiconductor layer is formed of niobium nitride represented by a chemical formula $Nb_3N_5$.

37. The semiconductor electrode according to claim 29, wherein
the first semiconductor layer is formed of titanium oxide represented by a chemical formula $TiO_2$; and
the second semiconductor layer is formed of niobium oxynitride represented by a chemical formula NbON.

38. The semiconductor electrode according to claim 29, wherein the light-transmissive conductor layer is formed of an oxide.

39. The semiconductor electrode according to claim 38, wherein the oxide is at least one light-transmissive conductive material selected from the group consisting of indium tin oxide, fluorine-doped tin oxide, and antimony-doped tin oxide.

40. The semiconductor electrode according to claim 29, wherein the light-transmissive conductor layer is formed of a stacked structure including a first light-transmissive conductive film and a second light-transmissive conductive film.

41. The semiconductor electrode according to claim 29, wherein
the light-transmissive conductor layer has a plurality of pillar protrusions or a plurality of grooves on a surface which is in contact with the second semiconductor layer; and the second semiconductor layer has an uneven structure which corresponds to the plurality of pillar protrusions or the plurality of grooves.

42. The semiconductor electrode according to claim 29, wherein the semiconductor electrode comprises a through-hole which penetrates the first semiconductor layer, the light-transmissive conductor layer, and the second semiconductor layer.

* * * * *